United States Patent
Kamysiak

(10) Patent No.: US 6,257,419 B1
(45) Date of Patent: *Jul. 10, 2001

(54) VERSATILE BICYCLE STAND

(76) Inventor: Jerry Kamysiak, 9528 Bolton Rd., Posen, MI (US) 49776

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,429

(22) Filed: Nov. 19, 1998

(51) Int. Cl.$^7$ .................................................. B62H 3/00
(52) U.S. Cl. .................................................. 211/22; 221/20
(58) Field of Search .................................. 211/22, 17, 18, 211/19, 20, 21, 23, 24, 175

(56) References Cited

U.S. PATENT DOCUMENTS

| D. 201,143 | * | 5/1965 | Vigilante | 211/22 X |
|---|---|---|---|---|
| 488,395 | | 12/1892 | Justice | 211/20 |
| 518,325 | * | 4/1894 | Mueller | 21/22 |
| 519,016 | * | 5/1894 | Clairmont | 211/22 |
| 557,470 | * | 3/1896 | Young | 211/20 |
| 564,787 | * | 7/1896 | Hart, Jr. | 211/17 |
| 574,689 | * | 1/1897 | Stover | 211/20 |
| 593,521 | * | 11/1897 | Fowler | 211/20 |
| 635,435 | * | 11/1899 | Fowler | 211/22 |
| 1,241,496 | * | 10/1917 | Armstrong | 211/21 X |
| 2,806,605 | * | 9/1957 | Loveland | 211/22 |
| 3,529,729 | * | 9/1970 | Gappa | 211/20 |
| 3,785,500 | * | 1/1974 | Kennelly | 211/17 X |
| 4,033,459 | | 7/1977 | Zach | 211/20 |
| 4,047,614 | * | 9/1977 | Radek | 211/20 |
| 4,306,660 | * | 12/1981 | Livingston | 211/20 |
| 4,465,196 | * | 8/1984 | Erb | 211/19 |
| 4,979,759 | * | 12/1990 | Solovay | 211/17 X |
| 5,096,068 | * | 3/1992 | The'riault | 211/22 |
| 5,133,461 | * | 7/1992 | Martinell | 211/21 |
| 5,137,192 | * | 8/1992 | Sheridan et al. | 211/17 X |
| 5,417,629 | * | 5/1995 | Phipps | 211/22 X |
| 5,476,203 | * | 12/1995 | Fletcher | 211/22 X |
| 5,489,030 | * | 2/1996 | Kolbeck et al. | 211/22 |
| 5,498,015 | * | 3/1996 | Trout et al. | 211/22 X |
| 5,544,763 | * | 8/1996 | McClain | 211/22 |

FOREIGN PATENT DOCUMENTS

| 227676 | * | 2/1960 | (AU) | 211/20 |
|---|---|---|---|---|
| 516867 | * | 11/1954 | (BE) | 211/20 |
| 212976 | * | 4/1941 | (CH) | 211/22 |
| 6422 | * | 3/1897 | (GB) | 211/20 |

OTHER PUBLICATIONS

Fontgate Catalog.
Graber Catalog.

* cited by examiner

Primary Examiner—Daniel P. Stodola
Assistant Examiner—Khoa Tran
(74) Attorney, Agent, or Firm—Orupal ® Asija

(57) ABSTRACT

An embodiment of the system of this invention comprises a U shaped base member having a pair of front wheel receptacles each in turn comprising a pair of uprights. Two such U shaped members may be interconnected in opposite orientation to form a rectangle such that four bikes can be staggered. A foot pad is included for easy ingress and egress. Support brackets are included to increase the strength and the durability of the versatile bicycle stand. Holes are provided in the base member to snugly receive uprights.

9 Claims, 3 Drawing Sheets

Figure 1:
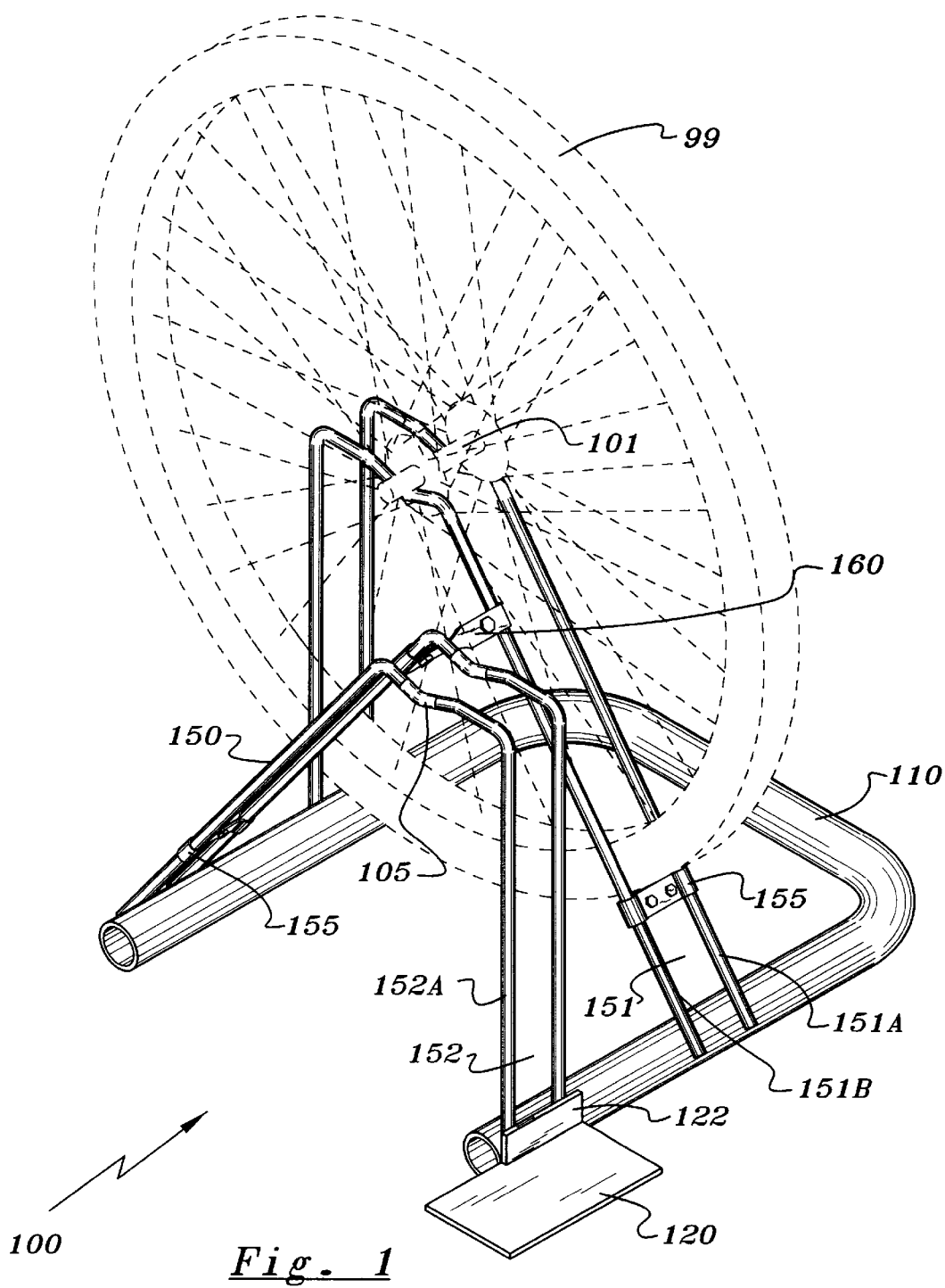

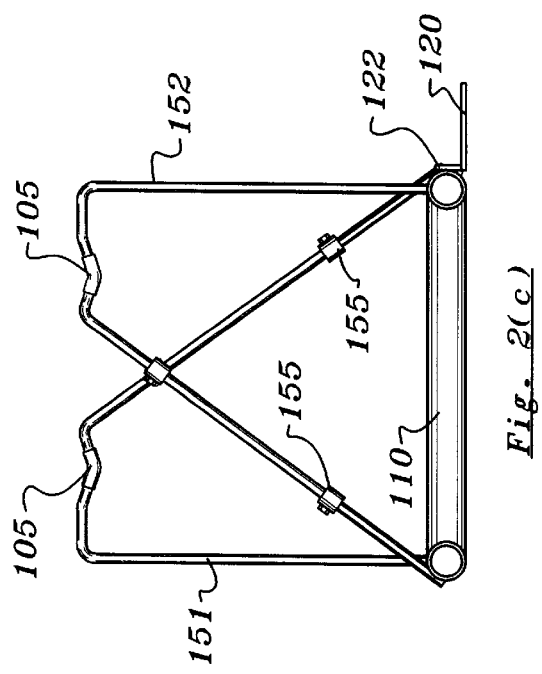
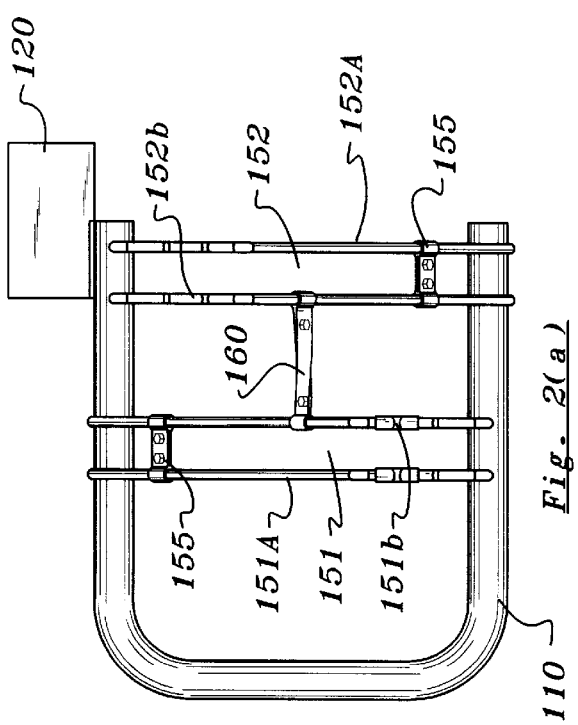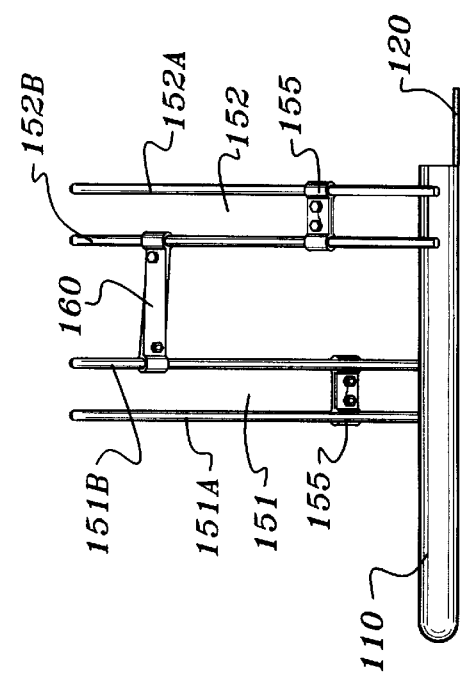

VERSATILE BICYCLE STAND

BACKGROUND

This invention relates to parking system. More particularly it relates to bicycle parking systems such as kickstands or bike racks. Even more particularly it relates to an improved bicycle stand which can be used in a garage or a show room to free up additional space while at the same time increasing the aesthetics and useability of the remaining space.

THE PROBLEM

The problem with prior art is that no matter how large a car garage consumers build, it always turns up being short on space. Subsequently, the walkway is blocked when bicycles are in the garage with cars. Conventional bicycle kickstands leave a bicycle laying at such an angle as to take up valuable walk space, especially when more than one bicycle exists. Dings and dents in car doors is the result. People trip over a mess of bikes as we walk through the garage.

SUMMARY

The Versatile Bicycle Stand of this invention which may be thought of as a "Bicycle Organizing & Parking System" or even as "Garage Expander For Bicycles" comprises a metal stand that enables homeowners to store bicycles in a neat, orderly and space saving way. It is for any family that owns more than one bicycle and a garage. It's also handy for winter storage. Its also ideal for bicycle sale show rooms with limited space. The versatile bicycle stand of this invention holds bicycles erect and staggered such that the second bike encroaches the space of the first one, closer to the wall.

An embodiment of the system of this invention comprises a U shaped base member having a pair of front wheel receptacles each in turn comprising a pair of uprights. Two such U shaped members may be interconnected in opposite orientation to form a rectangle such that 4 bikes can be staggered. A foot pad is included for easy ingress and egress. Support brackets are included to increase the strength and the durability of the versatile bicycle stand of this invention. Holes are provided in the base member to snugly receive uprights. The handlebars of the second bike easily fit over the frame of the first bike due to the inherent design of conventional bicycles. The result is a very neat package and walkway space is maximized. Car door dings and nicks are reduced or eliminated and the garage's appearance is one of neatest and organized.

PRIOR ART

A preliminary limited prior art search was conducted and furthermore the inventor is intimately familiar with the prior art. Following are typical examples of the prior art known to the inventor or his attorney arranged in the reverse chronological order for ready reference of the examiner and the reader.

a) U.S. Pat. No. 4,033,459 bestowed upon Donald Zach on Jul. 5, 1977 for "Modular Bicycle Rack"

b) U.S. Pat. No. 488,395 granted to W. M. Justice on Dec. 20, 1892 for "Cycle Stand"

c) Bicycle Stand as depicted and offered for sale in Front Gate mail order catalog.

d) A variety of bicycle stands as offered for sale in Graber Catalog, 5253 Verona Road, Madison, Wis. 53711 USA, http://www.graber-products.com PH:1-608-274-6550, or 1-800-783-7257, FAX: 1-608-274-1702

The best known closes prior to the applicant's invention is U.S. Pat. No. 4,033,459 which is also not close enough because it mandates bicycles be put in opposite directions as evidenced by how close the consecutive slots are together. This indicates two bicycles would take up for almost twice the lineal feet of garage wall for easy ingress and egress.

Four bicycles for which that stand is designed for, would not be suitable for a residential garage because the width which is the distance from the wall to farthest point away from the wall, is far too great which in turn encroaches on walkway space. Furthermore U.S. Pat. No. 4,033,459 traps the bicycle tire from the sides and one end the Garage Expander supports the axle of the wheel after elevation.

Unfortunately none of the prior art devices singly or even in combination provide all of the features and objectives established by the inventor for this system as enumerated below.

OBJECTIVES

1. It is an objective of this invention to provide method, devices and system for organizing and storing bicycles in staggered erect manner for use in garages, sales showrooms and the like places conveniently, quickly and affordably.

2. Another objective of this invention is to provide a means for standing a plurality of bikes in the same orientation.

3. Another objective of this invention is that it be easy to load and unload or ingress and egress.

4. Another objective of this invention is that it is easy to use by people of small or weak stature.

5. Another objective of this invention is that its use be intuitive that requires little additional training or energy.

6. Another objective of this invention is that it be environmentally friendly and physically safe in normal environment as well as accidental situations.

7. Another objective of this invention is that the bicycles not tip over easily or accidentally.

8. Another objective of this invention is that it obviate any welding.

9. Another objective of this invention is that it meet all federal, state, local and other private standards, guidelines and recommendations with respect to safety, environment, quality and energy consumption.

10. Another objective of this invention is that it be made of modular units easily interface-able to each other.

11. Another objective of this invention is that the invention when used in a garage creates the reality of an organized and the illusion of an expanded garage.

12. Another objective of this invention is that when used in a bicycles sales show room it facilitates close and easy inspection of each of the plurality of bikes.

13. Another objective of this device that its suitable for all types of uses anywhere.

14. Another objective of this invention is that it fit all sizes of bike wheels too, from children's bikes to 26" Mountain bikes.

15. Another objective of this invention is that it be easy to install, de-install, transport and store.

16. Another objective of this invention is that it require no maintenance, or periodic adjustment.

17. Another objective of this invention is that the stand not come in contact with the spokes of the wheel during support or otherwise damage the bike in any manner.

18. Another objective of this invention is that it be light weight and yet hold even one bike securely.

19. Another objective of this invention is that it make provisions for efficient boxing handling and shipping.

20. Another objective of this invention is that it prevent or at least not cause in scratches, nicks and dents on the bicycles stored therein during ingress and egress in particular.

Other objectives of this invention reside in its simplicity, elegance of design, ease of manufacture, service and use and even aesthetics as will become apparent from the following brief description of the drawings and concomitant description.

Figure 3:
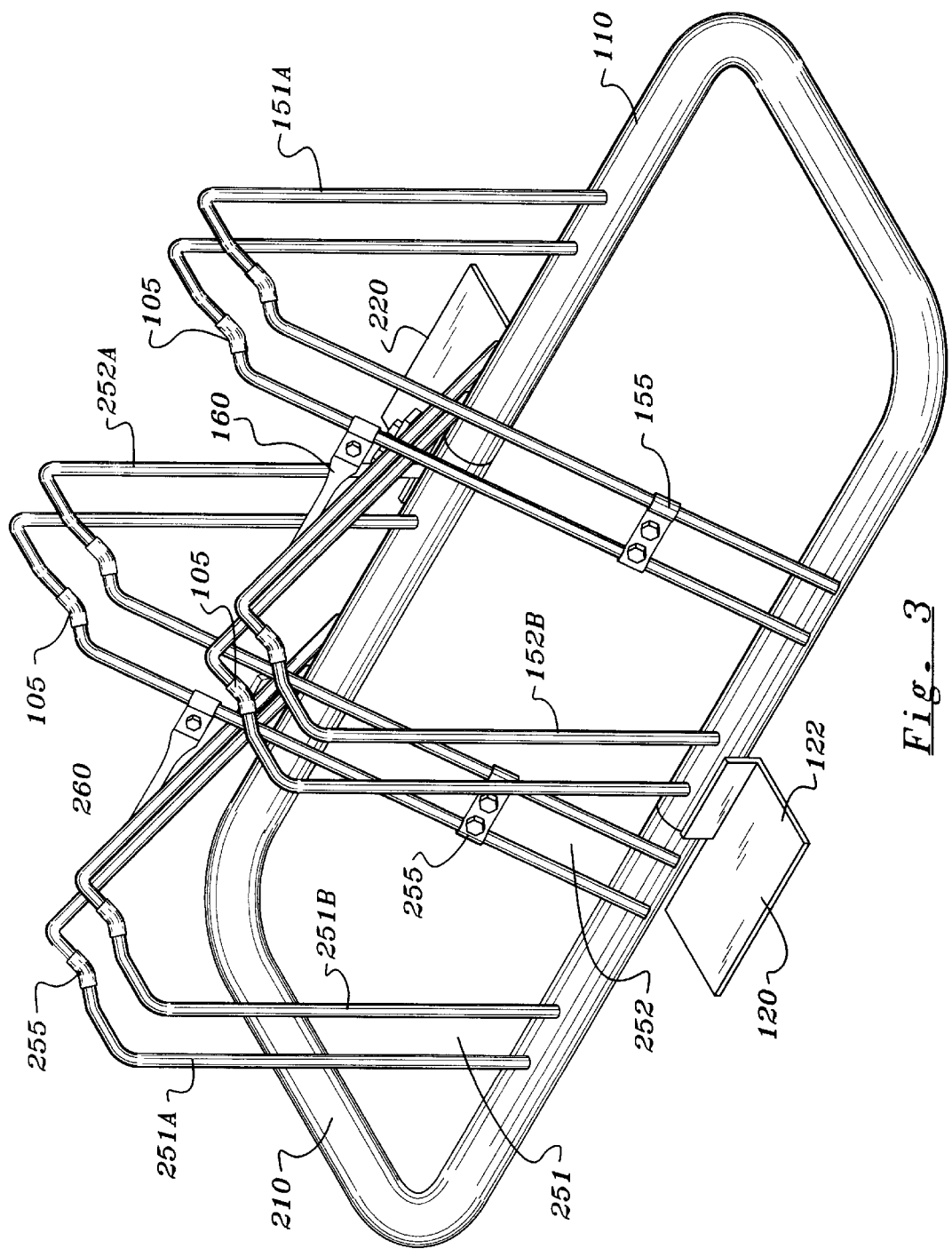

BRIEF DESCRIPTION OF THE DRAWINGS a). FIG. 1 is a three dimensional perspective view of the versatile bicycle stand of this invention comprising a pair of parallel bike wheel receptacle bars each capable of receiving the front wheel (shown in dotted lines) of a bike.

b) FIG. 2 (*a*) is a top plan elevation thereof.

c) FIG. 2 (*b*) is a front elevation thereof.

d) FIG. 2 (*c*) is a right side elevation thereof.

e) FIG. 3 shows another three dimensional perspective view of an alternate embodiment which comprise a pair of versatile bike stands in opposite orientation so as to hold 4 bikes particularly suitable for use in bicycles sales show rooms where the need to inspect each bike closely in a limited space is of paramount importance.

DETAILED DESCRIPTION OF THE PREFERRED EMBODIMENT

The multipurpose versatile Bicycle Stand of this invention as shown in the drawings wherein like numerals represent like parts throughout the several views, there is generally disclosed in FIG. 1 a three dimensional perspective view of the versatile bicycle stand 100 of this invention comprising a pair of parallel bike wheel receptacle upright bars 151, 152 each capable of receiving the front wheel 99 (as shown in dotted lines) of a bike.

In the best mode preferred embodiment this invention comprises a U shaped base member 110 having a pair of front wheel receptacles 150 each in turn comprising a pair of uprights 151A, 151B or 152A, 152B. Two such U shaped members 110 may be interconnected in opposite orientation to form a rectangle such that 4 bikes can be staggered. A foot pad 120 is connected to the U shaped base 110 via an interface 122 for easy ingress and egress. Support brackets 160 are included to increase the strength and the durability of the versatile bicycle stand of this invention.

Holes (not shown) are provided in the base member to snugly receive uprights 151A, 151B or 152A, 152B FIG. 2 (*a*) is a top plan elevation thereof complete with U shaped base member 110, foot pad 120, wheel rest 155, uprights 151A, 151B or 152A, 152B and interconnecting strength bracket 160.

FIG. 2 (*b*) is a front elevation thereof complete with U shaped base member 110, foot pad 120, wheel rest 155, uprights 151A, 151B or 152A, 152B and interconnecting strength bracket 160.

FIG. 2 (*c*) is a right side elevation thereof complete with U shaped base member 110, foot pad 120, wheel rest 155, axle rest 105 lined with a soft material such as VELCRO hooks to prevent noise and damage to the axle, uprights 151A, 151B or 152A, 152B.

FIG. 3 shows another three dimensional perspective view of an alternate embodiment which comprises a pair of versatile bike stands 100 in opposite orientation so as to hold front wheels 99 of four bikes particularly suitable for use in bicycles sales show rooms where the need to inspect each bike closely in a limited space is of paramount importance. FIG. 3 also shows axle rest 105 lined with a soft material such as VELCRO® hooks to prevent noise, and damage to the axle of the bicycle, wheel rest 155 and strengthening brace bracket 160. Second unit reference numerals are in the image of the first one for example 151 becomes 251; 160 is labeled 260 etc. In either embodiment the bike stand U shaped base 110 is made from 1+½" tubing 110. Holes are installed to accommodate the uprights 151, 251, 252, 252 A or B which are made from ⅜" cold roll (round stock) steel.

NOTE: It should be noted that the holes are not visible because they are covered by the upright members 151, 252 etc.

The uprights 151, 152 A or B are held in an upright and sturdy position, so as to support the weight of two bicycles, by the formed brackets (sets) between each one. Otherwise the uprights would tip over when the weight of the bicycle was addressed. The brackets also eliminate any need for welding any point of the stand. This is a bike support, not a slotted device. Optionally included is a small wooden piece (not shown) to function as a convenient ramp for kids to push their bike on the rack.

It would lie on the floor and only tangentially related to this patent application. The versatile bike stand takes about six extra inches of space to fit two (2) bicycles over the space one free standing bicycle utilizing a standard kickstand uses. Ingress and egress is easy even for youngsters and petite women or even men of feeble constitution. It fits all sizes of bike wheels too, from children's bikes to 26" Mountain bikes. The inventor is particularly proud of the following features and benefits.

1. It holds bikes completely vertical unlike conventional kickstands.

2. It won't tip bikes over easily, if bumped accidentally like standard bicycle kick stands would.

3. Overall space utility and walkway space is increased dramatically for easy ingress and egress. Uses less floor space area to store two bicycles than any floor stand or rack known in the prior art.

4. The two benefits result:

a) Organization is guaranteed.

b) Walkways clear of bicycles also guaranteed.

5) It's "no weld" design allows for very efficient boxing handling and shipping.

6) The logistics are greatly reduced by the innate design characteristics of this versatile bicycle stand.

7) One size fits 99% of all bicycles on the market and holds any sizes just as securely as another.

8) It is better than wall hooks, because women, children and physically challenged cannot lift a bicycle over their heads.

9) User does not need to lift the entire bicycle instead only the front wheel 6" and drop it on.

10) Floor pad is for ease of egress or unloading. Step on it to hold stand stationary, in case your bike fits snugly.

11) No maintenance, no periodic adjustment is necessary. Stand does not come in contact with the spokes during support.

12) The no welding point is a salient feature of this invention as all of the of prior art need welding during fabrication. In the context of stands it's attractive. Easy to assemble. Just about anyone can do it.

It doubles as a "Bike Store Display Rack" for retailers who wish to use it as well as sell it. Currently, in a show room bicycles are staged in one continuous row, which makes it difficult, if not impossible to get close enough to inspect a particular bike short of pulling it completely out of its position in the row.

As a DIY kit metal pipes with plastic end-caps are supplied to optionally allow filling of tube with sand or other heavy material to add additional weight to the base, if desired.

EXAMPLE

If two units are assembled together in opposite orientation, then four bicycles can be displayed in such a manner as to allow access for the customer to walk completely around each of the four (4) bicycles to observe them, all while conserving floor space. Bicycle retailers that have a limited space in the store can use either one or a pair of these in opposite orientation maximizing display space.

On the other hand if they wish to carry a few bikes away from the store to exhibit. This invention works better there, too. Like wise it saves on off-season storage room space, too.

The "Garage Expander Bicycle Organizer" of this invention is literally and figuratively a "Life Enhancer" that people will miss when they are physically away from it, using bicycles. This is due to it's being handy to ingress and egress and any time it is used, a bicycle log jam situation is averted, that in itself is gratifying to any individual. Secondly, it is such a neat looking finished package, it is admired.

USE & OPERATION

The use and operation of this device by a consumer is simple and even intuitive. The device is assembled in two or four bike configuration as shown in FIGS. 1 and 3 respectively. The inventor recommends the following steps.

a) Arrange the bike stand with closed end of U shaped parallel to and nearest to the nearest garage wall with first front wheel in forward position. In other words the base and legs (open end of U shaped base) are pointed away from the nearest parallel wall.

b) Ingress the first bike front wheel into the stand nearest the wall or closed end of the U shaped base.

NOTE: It should be noted that this is best done by lifting axle about a 6" and placing the same on the concave receptacle provided for it.

c) Ingress the second bike if and when necessary.

NOTE: It should be noted that in the showroom embodiment 3rd and 4th bikes may also be added.

d) For egress the reverse order should be used while at the same time pressing on the foot rest to facilitate easier egress.

The inventor has given a non-limiting description of the concept. Many changes may be made to this design without deviating from the spirit of this invention. Examples of such contemplated variations include the following:

1. The shape and size of the various members and components may be modified.
2. The color, aesthetics and materials may be enhanced or varied.
3. The base may be made in the form of H.
4. Additional complimentary and complementary functions and features may be added.
5. Pipe or tubing or angle iron may be used.
6. A more economical version of the device may be adapted with an informational or advertising message of the sponsor for promotional give aways.
7. The base could be square tube base, with T bar uprights notwithstanding they would be dangerous, If fallen on.
8. It could also be one continuous flow (maze) of ⅜ wire with two area that match axle support areas notwithstanding this would be costly to package and ship.

Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

99=Front wheel of a bicycle
100=Bike stand invention generally
101=Front wheel axle
105=Axle rest point concave receptacle lined with a soft material such as VELCRO® hooks to prevent noise, damage etc.
110=U shaped base member made of 1.5" tube with ²⁵⁄₆₄" holes punched on the inside.
120=Foot pad for removing bike if and when stuck
122=Foot rest interface to the base
150=Parallel bar wheel receptacle generally
151=Front wheel receptacle member 1 generally
151A=First upright with ends bent outward to expand into holes into the stand base. In the preferred embodiment the inventor used ⅜" cold roll steel.
151B=Staggered second upright front wheel receptacle as there are two uprights.
NOTE: It should be noted that two uprights 151A and 151B make one front wheel receptacle.
152=Front wheel receptacle member 2 generally
NOTE: It should be noted that two uprights 152A and 152B make one front wheel receptacle.
152A=Third upright with ends bent outward to expand into holes into the stand base. In the preferred embodiment the inventor used ⅜" cold roll steel.
152B=Fourth upright front wheel receptacle as there are two uprights for each stand.
NOTE: It should be noted that the 3rd and 4th uprights are oriented in the opposite direction of 1st and second uprights.
155=Front wheel rest point or support bracket generally
155A=First support bracket
155B=Second support bracket
160=Center brace interconnecting member between 151 and 152 to enhance stability of the two sets of uprights.
251=Front wheel receptacle member 1 generally for the second unit
251A=First upright with ends bent outward to expand into holes into the stand base. In the preferred embodiment the inventor used ⅜" cold roll steel.
251B=Staggered second upright front wheel receptacle as there are two uprights.
NOTE: It should be noted that two uprights 151A and 151B make one front wheel receptacle.
252=Front wheel receptacle member 2 generally for the second unit.

NOTE: It should be noted that two uprights 152A and 152B make one front wheel receptacle.

252A=Third upright with ends bent outward to expand into holes into the stand base. In the preferred embodiment the inventor used ⅜" cold roll steel.

252B=Fourth upright front wheel receptacle as there are two uprights for each stand.

NOTE: It should be noted that the 3rd and 4th uprights are oriented in the opposite direction of 1st and second uprights.

255=Front wheel rest point or support bracket generally

255A=First support bracket

255B=Second support bracket

260=Center brace interconnecting member between 251 and 252 to enhance stability of the two sets of uprights.

DEFINITIONS AND ACRONYMS

A great care has been taken to use words with their conventional dictionary definitions. Following definitions are included here for clarification.

3D=Three Dimensional

Asymmetrical=The shape of an object of integrated entity which can not be divided into two along some axis through the object or the integrated entity such that the two halves form mirror image of each other.

DIY=Do It Yourself

Integrated=Combination of two entities to act like one

Interface=Junction between two dissimilar entities

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

What is claimed is:

1. A versatile bicycle parking system comprising:
    a) a U shaped base;
    b) a pair of parallel and staggered front wheel receptacles as a means for parking a pair of bicycles vertically upright and facing in the same direction and connected to said U shaped base at two opposite ends of said U shaped base;
    c) a foot pad connected at one end of said U shaped base;
    d) an adjustable wheel support horizontal member on each of said pair of front wheel receptacles;
    e) a strengthening brace bracket connected between said pair of front wheel receptacles; and
    f) an underneath axle support and rest lined with a soft material and mounted on each of said pair of front wheel receptacles.

2. The versatile bicycle parking and storage system of claim 1 wherein each of said pair of front wheel parallel and staggered receptacles in turn comprises a pair of parallel uprights.

3. The versatile bicycle parking and storage system of claim 2 wherein said adjustable wheel support horizontal member is connected to each of said parallel uprights.

4. The versatile bicycle parking and storage system comprising two symmetrical units in opposite orientation, each said unit in turn comprising:
    a) a U shaped base;
    b) a pair of parallel and staggered front wheel receptacles as a means for receiving a pair of front wheels of a pair of bicycles vertically upright facing in the same direction and connected to said U shaped base at two opposite ends of said U shaped base;
    c) a foot pad connected at one end of said U shaped base;
    d) a wheel support horizontal member on each of said pair of front wheel receptacles;
    e) a strengthening brace bracket connected between said pair of front wheel receptacles; and
    f) an axle rest mounted on each of said pair of front wheel receptacles and lined with a soft material.

5. The versatile bicycle parking and storage system of claim 4 wherein each of said pair of front wheel parallel and staggered receptacles in turn comprises a pair of parallel uprights.

6. The versatile bicycle parking and storage system of claim 5 wherein said adjustable wheel support horizontal member is connected to each of said parallel uprights.

7. A process of parking and storing a pair of bicycles comprising the steps of:
    a) mounting a pair of parallel and staggered front wheel receptacles as a means for parking vertically upright a pair of bicycles facing in the same direction and connected to a U shaped base at least at two opposite ends;
    b) adding a foot pad connected at one end of said U shaped base;
    c) attaching an adjustable wheel support horizontal member to each of said pair of front wheel receptacles;
    d) incorporating a brace bracket between said pair of front wheel receptacles;
    e) providing an underneath axle support and rest on each of said pair of front wheel receptacles lined with a soft material;
    f) ingressing the first bike front wheel into the stand nearest the wall or closed end of the U shaped base;
    g) ingressing the second bike (if and when necessary); and
    h) egressing said bikes in the reverse order.

8. The process of parking and storing bicycles of claim 7 wherein each of said pair of parallel and staggered front wheel receptacles in turn comprises a pair of parallel uprights.

9. The process of parking and storing bicycles of claim 7 wherein said adjustable wheel support horizontal member is connected between each of said parallel uprights.

* * * * *